United States Patent Office 3,138,471
Patented June 23, 1964

3,138,471
ACID-RESISTANT CEMENT PRODUCTS
James F. Wygant, Gary, Ind., assignor to Standard Oil Company, Chicago, Ill., a corporation of Indiana
No Drawing. Filed Sept. 23, 1960, Ser. No. 57,909
5 Claims. (Cl. 106—84)

This invention relates to acid-resistant cement products. More particularly it relates to chemically-setting acid-resistant cement products containing silicate of soda as a binder.

Acid-resistant compositions of cements, mortars and concrete employing silicate of soda as a cementitious agent are well known. Such acid-resistant cements generally consist of a silicate of soda solution, an acidic setting agent and an acid-resistant aggregate, and these cements set chemically, rather than by drying. Almost all of these cements have compressive strengths not exceeding about 2,500 p.s.i., which is considered too low to enable these materials to be widely used in concrete construction. Present silicate of soda cements are also subject to severe restrictions in their use for resistance to sulfuric acid, because of sulphate disintegration which occurs when sulfuric acid permeates the cement and combines with free or loosely bound sodium. This mechanism is believed to result in the formation of sodium sulphate which is deposited as anhydrous $Na_2SO_4$ crystals in pores close to the exposed faces of the cement. The presence of moisture then causes hydration to Glauber's salt, $Na_2SO_4 \cdot 10H_2O$, with resultant expansion forces which disrupt the cement and cause it to crack and disintegrate.

The present invention provides chemically-setting acid-proof cement products, e.g. cements, mortars, concretes, etc., having increased resistance to sulphate disintegration. Such products also possess relatively high compressive strengths, often of above about 4,000 p.s.i. Also of importance is the fact that the cement products of the present invention can be produced at a low cost compared to commercially available acid-resistant cement products.

The present invention provides a chemically-setting acid-resistant cement product comprising silicate of soda, an acid-resistant aggregate, an acidic setting agent and a water soluble alkali metal phosphate added in an amount between about 2 and about 100 parts by weight, based on 100 parts of said silicate of soda, the combined amounts of the setting agent and the phosphate being effective to cause the cement to set.

The prior art cement products are generally referred to as "acid-proof" cements and are successfully used with nearly all types of acidic solutions with the exception of hydrofluoric acid or fluoride solutions. However, the term "acid-resistant" is employed herein since the so-called "acid-proof" cements are subject to varying degrees of acid attack in some instances.

Sodium silicate is commercially available in several forms as a solution or in soluble dry form. The preparation, properties, and uses of sodium silicate are discussed in detail in the publication "Soluble Silicates" by James G. Vail, ACS, Monograph 116, Reinhold Publishing Corporation, New York, N.Y. (1952), volume II.

Soluble dry silicates can be used with sufficient water added to the mix to dissolve the silicates. However, it is preferable to use a silicate solution for most applications. Silicate of soda solutions having ratios of soda to silica varying over a broad range, generally from about 1:3.00 to 1:3.75, and preferably a ratio of 1:3.22 are used in preparing the mix. A commercially available solution which has a soda to silica ratio of 1:3.22 and contains about 37.6% solid sodium silicate has been found to be very satisfactory for use, in that only a small amount of additional water is required when the concrete is to be poured in place by ordinary methods. This particular solution provides a wet mix having an especially desirable viscosity and workability. The strength of the concrete of the present invention, like that of other types, is reduced by additions of water to the mix.

There are a large number of compounds which can be used to precipitate gels from silicate of soda solutions, many of which have been used as setting agents for silicate of soda acid-proof cements. Oxides, such as MgO, ZnO and various lead oxides, may be employed for this purpose. Calcium carbonate and calcium sulphate, as well as carbonates and other salts of lead and other heavy metals, also may be used. Moderately to easily soluble acid salts of strong acids, such as acid sulphates, acid phosphates, and acid fluorides, as well as soluble Group II metal salts of strong acids, such as calcium chloride, are active precipitating agents. Group II metal salts of weak acids, such as calcium acetate will also gel silicates of soda. The moderately soluble fluorides and silico-fluorides of the alkali metals and of Group IIB metals are effective precipitating agents, and those of sodium, Zn and Mg have frequently been used in cement. Various organic precipitants, of which the most important are esters of monohydric or dihydric alcohols such as ethyl acetate, amyl acetate, glyceryl diacetate, may be used.

The setting agent, or precipitating agent used in cement products should provide a sufficiently long and reliable setting time to permit mixing, handling and placement of the material. It must cause the development of an acceptable high strength material. The reaction products and the gel structure should be of low solubility. Preferably, the silico-fluorides and some organic precipitants are used as primary precipitants, e.g., used alone or with minor portions of other precipitants, and provide acceptable high strengths and slow setting rates. Because of the favorable cost and desirable properties imparted to the resulting product, sodium silico-fluoride is the preferred setting agent used in the practice of the present invention.

Water soluble alkali metal phosphates such as sodium phosphates, when incorporated in sodium silicate type acid-resistant cements, in combination with the commonly used setting agents, such as sodium silico-fluoride, have been found to impart superior properties, e.g., resistance to sulphate disintegration and also high compressive strengths, to the cement. The quality of the material produced will vary according to the particular phosphate employed. Advantageously, a sodium phosphate, such as sodium orthophosphate ($Na_3PO_4$), sodium tripolyphosphate ($Na_5P_3O_{10}$), or sodium hexametaphosphate ($NaPO_3)_6$ is employed in combination with a setting agent such as sodium silico-fluoride ($Na_2SiF_6$) to obtain a very satisfactory material which is resistant to sulphate disintegration and has a cement compressive strength in the order of about 4,000 p.s.i. or higher. Preferably, the above-mentioned phosphate is in a finely divided form so as to be readily soluble in the wet mix or in an aqueous solution.

Acid-proof aggregates of varying types and sizes are used in preparing the materials of the present invention. It is to be understood that the term "very fine aggregate," as used herein, refers to a finely-divided aggregate, such as silica flour, or pulverized silica, having particle size predominantly smaller than about 325 mesh; "fine aggregate" refers to an aggregate size comparable to that of sand generally used in preparing concrete mixes, such as silica sand of about 20 to 30 mesh; and "coarse aggregate" refers to still larger aggregate sizes such as are employed in concrete mixes.

Acid-resistant aggregates which may be used in the practice of the present invention include barite, quartz and quartzite, alumina, zirconia, etc. Other forms such as refractory inert oxide compounds, e.g., mullites and spinels, certain glasses, e.g., borosilicate, vitreous silica, amorphous silica, e.g., flint, calcined clays, and dense acid-resistant rocks may also be employed as acid-resistant aggregates. Other acid-resistant aggregates such as asbestos minerals, chromic oxides, etc., are also known. However, it is recognized that not all of these materials possess the same degree of acid-resistance as pure silica, which is the preferred acid-resistant aggregate.

It is important that some form of very finely-divided substantially anhydrous silica be employed as an active ingredient in the practice of the present invention, in order to provide a volume of non-shrinking material having surface characteristics especially suitable for combining with the silicate gel to form a strong volume-stable cementitious matrix. A commercially available item which is especially suitable for this purpose is finely ground quartz or quartzite, known as silica flour, pulverized silica, ground quartz, etc., the terminology varying with the degree of fineness and with the producer and intended consumer. Other silica-containing minerals of sufficient fineness such as some types of asbestos floats, clays and acidic rocks have similar but less effective surface activity, but they do not combine volume stability, acid-resistance and surface activity as satisfactorily as finely-divided silica which is the preferred very fine aggregate.

It is to be understood that wide variations in the proportions of ingredients may be mixed to provide the cement products of the present invention. The workability, strength, acid-resistance, etc., as with cement products in general, will vary according to the particular mix employed in the practice of the invention. However, as an example of the mixes which may be employed, a mortar could be prepared within the limits of the following proportions:

| | |
|---|---|
| Fine acid-resistant aggregate | 1,000 parts by weight. |
| Sodium silicate | 100 to 250 parts by weight. |
| Very fine acid-resistant aggregate | 200 to 1,000 parts by weight. |
| Setting agent | 12 to 500 parts by weight. |
| Alkali metal phosphate | 6 to 100 parts by weight. |
| Water | As needed for consistency. |

It is generally advantageous to premix all of the dry materials, then to add and mix a silicate of soda solution and to add water as needed to adjust the consistency of the wet mix. Various mixers, such as ordinary drum-type concrete mixers, can be employed. After pouring and placing, these compositions may be cured by standing in air at ambient temperatures or by other curing methods best suited for the particular application.

The preferred range of compositions employed in a particular wet mortar mix prepared according to the concept of the present invention is as follows:

| | Parts by weight |
|---|---|
| Graded silica sand | 525 |
| Sodium silico-fluoride | 10 to 150 |
| Sodium phosphate | 6 to 28 |
| Silica flour | 280 to 410 |
| Silicate of soda solution (37.6% solids) | 200 to 250 |
| Water | 0 to 20 |

The preferred formulation which has been employed in preparing a mortar possessing very satisfactory properties is shown in Table I.

*Table I*

| | |
|---|---|
| Silica sand, 20–30 mesh | 525 parts by weight. |
| Silica flour, passing 325 mesh | 350 parts by weight. |
| Sodium silico-fluoride, passing 100 mesh | 50.8 parts by weight. |
| Sodium tripolyphosphate, passing 100 mesh | 15 parts by weight. |
| Silicate of soda (37.6% solids), 1:3.22 soda to silica ratio | 234 parts by weight. |
| Water | Not to exceed 15 parts by weight. |

It is to be understood that the ranges of ingredients employed in the present invention cannot necessarily be varied individually. For example, in selecting the amounts of the setting agent and the phosphate, it is necessary that the amounts be selected so that the combined effects of these two ingredients cause the cement to set within the desired period of time. It is further understood that the compositions as described above, may be combined with various aggregates hereinbefore described, to produce cements, mortars, concretes, etc.

The compressive strengths of the compositions prepared according to the above-described preferred formulation have been found to vary from about 2000 p.s.i. to about 5900 p.s.i. after standing 5 days in air. Weight losses after boiling in 76% sulfuric acid according to ASTM Designation C279–54 range from about 2 to 10%.

The preferred formulation as described above has been tested and found to have strengths as shown in Table II.

*Table II*

| Specimen Type | Age, days | Mortar, p.s.i. | Concrete,[1] p.s.i. |
|---|---|---|---|
| 6″ cylinder | 53 | 3,900 | 3,440 |
| 3¾″ cylinder | 53 | 3,980 | 3,530 |
| 2″ cube | 5 | 4,000–4,800 | |
| 2″ cube | 53 | 4,600 | 4,390 |

[1] Concrete contained 1 inch crushed quartzite, crushed acid-proof brick graded from ¼″ to fine, and mortar of the above-listed preferred composition, except that acid-proof brick fines replace some of the graded sand.

The sulfate disintegration resistance of the above-described compositions has been tested by the "stress box" test, wherein a 12″ cube with walls and bottoms of about 1 inch thickness is prepared and the cement box filled with about 10 or 20% sulfuric acid. Boxes made of cements susceptible to sulphate disintegration fail by either spalling or sloughing of the exterior surface within a relatively short time. The compositions of the present invention have survived the "stress box" test for months at a time and are indicated to be very satisfactory materials from this standpoint.

Laboratory tests which have been performed on the above-described cement products also indicate they are very satisfactory for use with hydrochloric acid, acetic acid, ammonium nitrate solutions and many other acids. Thus, these materials are of value in many applications where hydraulic concretes are unsatisfactory.

While my invention has been described with reference to the particular embodiments described herein, variations in materials and proportions which fall within the spirit and scope of the present invention will become apparent to the skilled artisan.

Having described my invention, what I claim is:

1. A chemically-setting, acid-resistant cement product prepared from a mix comprising silica sand in an amount of about 1000 parts by weight, silicate of soda in an amount between about 100 to about 250 parts by weight, silica flour in an amount between about 200 and about 1000 parts by weight, sodium silico-fluoride in an amount between about 12 and about 500 parts by weight, and a fully basic sodium phosphate of the group consisting of sodium orthophosphate, sodium tripolyphosphate and sodium hexametaphosphate in an amount between about 6 and about 100 parts by weight, the combined amounts of said sodium silico-fluoride and said phosphate being effective to cause said acid-resistant cement to set.

2. A chemically-setting, acid-resistant cement product prepared from a mix comprising about 525 parts by weight of fine silica sand; about 10 to 150 parts by weight of sodium silico-fluoride; about 6 to about 28 parts by weight of fully basic sodium phosphate of the group consisting of sodium orthophosphate, sodium tripolyphosphate and sodium hexametaphosphate; about 280 to about 410 parts by weight of silica flour; and about 60 to about 90 parts by weight of silicate of soda having a weight ratio of soda to silica between about 1:3.00 and about 1:3.75.

3. A chemically-setting, acid-resistant cement product prepared from a wet mix comprising about 525 parts by weight of 20 to 30 mesh silica sand; about 350 parts by weight of silica flour substantially passing 325 mesh; about 50 parts by weight of sodium silico-fluoride; about 15 parts by weight of a fully basic sodium phosphate of the group consisting of sodium orthophosphate, sodium tripolyphosphate and sodium hexametaphosphate; about 230 parts by weight of a silicate of soda solution having a weight ratio of soda to silica of about 1:3.22 and containing about 37% solids; and less than about 15 parts by weight of water.

4. The cement product of claim 3 wherein said sodium phosphate is sodium tripolyphosphate.

5. In the preparation of chemically-setting, acid resistant cement products from a mix comprising silica sand in an amount of about 1000 parts by weight, silicate of soda in an amount between about 100 to about 250 parts by weight, silica flour in an amount between about 200 and about 1000 parts by weight, sodium silico-fluoride in an amount between about 12 and about 500 parts by weight, the improvement consisting of incorporating in said mix, a water soluble fully basic alkali metal phosphate of the group consisting of sodium orthophosphate, sodium tripolyphosphate and sodium hexametaphosphate in an amount between about 2 to about 100 parts by weight, based on 100 parts of said silicate of soda, whereby increased resistance to sulphate disintegration is provided in the product upon setting.

References Cited in the file of this patent

UNITED STATES PATENTS

| | | |
|---|---|---|
| 1,998,935 | Kuzell et al. | Apr. 23, 1935 |
| 2,077,258 | Pitt | Apr. 13, 1937 |
| 2,114,923 | Halstead | Apr. 19, 1938 |
| 2,195,586 | Snell | Apr. 2, 1940 |
| 2,240,393 | Dietz | Apr. 29, 1941 |
| 2,323,029 | Goodrich | June 29, 1943 |
| 2,483,836 | McCoy | Oct. 4, 1949 |

FOREIGN PATENTS

| | | |
|---|---|---|
| 507,396 | Great Britain | June 14, 1939 |